United States Patent
Sin

(10) Patent No.: US 9,946,274 B2
(45) Date of Patent: Apr. 17, 2018

(54) APPARATUS AND METHOD FOR CONTROLLING TEMPERATURE

(71) Applicant: LSIS CO., LTD., Anyang-si, Gyeonggi-do (KR)

(72) Inventor: Yong Gak Sin, Anyang-si (KR)

(73) Assignee: LSIS CO., LTD., Anyang-si, Gyeonggi-do (KR)

( * ) Notice: Subject to any disclaimer, the term of this patent is extended or adjusted under 35 U.S.C. 154(b) by 293 days.

(21) Appl. No.: 14/809,024

(22) Filed: Jul. 24, 2015

(65) Prior Publication Data

US 2016/0041566 A1 Feb. 11, 2016

(30) Foreign Application Priority Data

Aug. 6, 2014 (KR) .................. 10-2014-0101143

(51) Int. Cl.
  *G05D 23/19* (2006.01)
  *G05B 19/05* (2006.01)
  (Continued)

(52) U.S. Cl.
  CPC ........... *G05D 23/1917* (2013.01); *G01K 7/00* (2013.01); *G05B 19/05* (2013.01); *G05B 19/054* (2013.01);
  (Continued)

(58) Field of Classification Search
  CPC ........... G05D 23/1917; G05D 23/1927; G05D 23/22; G01K 7/00; G05B 19/05;
  (Continued)

(56) References Cited

U.S. PATENT DOCUMENTS

| 4,532,601 A | 7/1985 | Lenderking et al. |
| 5,293,505 A * | 3/1994 | Ogawa ................. H03K 17/785 |
| | | 250/551 |

(Continued)

FOREIGN PATENT DOCUMENTS

| CN | 102129262 | 7/2011 |
| CN | 103034264 | 4/2013 |

(Continued)

OTHER PUBLICATIONS

European Patent Office Application Serial No. 15178598.7, Search Report dated Mar. 7, 2016, 11 pages.

(Continued)

*Primary Examiner* — Thomas Lee
*Assistant Examiner* — Tri T Nguyen
(74) *Attorney, Agent, or Firm* — K&L Gates LLP

(57) ABSTRACT

A temperature control apparatus is provided. The temperature control apparatus includes an analog to digital (AD) converter digital-converting a measurement value transmitted from a plurality of temperature sensors; a control means comparing the measurement value transmitted from the AD converter with a preset desired value to perform PID calculation; and an output unit transmitting, to outside, a pulse width modulation (PWM) control signal transmitted form the control means, wherein an input-side isolator for isolation for each temperature sensor is provided between the AD converter and the temperature sensor, the input-side isolator is connected to each of the temperature sensors, and the control means sequentially operates the input-side isolators.

6 Claims, 4 Drawing Sheets

(51) Int. Cl.
*G01K 7/00* (2006.01)
*G05D 23/22* (2006.01)

(52) U.S. Cl.
CPC ......... *G05D 23/1927* (2013.01); *G05D 23/22* (2013.01); *G05B 2219/1167* (2013.01); *G05B 2219/13095* (2013.01)

(58) Field of Classification Search
CPC .......... G05B 19/054; G05B 2219/1167; G05B 2219/13095
See application file for complete search history.

(56) References Cited

U.S. PATENT DOCUMENTS

| | | | | |
|---|---|---|---|---|
| 5,477,504 | A | * 12/1995 | Hagerty | H04B 3/30 330/258 |
| 8,599,915 | B2 | * 12/2013 | Zhao | H05B 33/0827 332/109 |
| 2011/0292556 | A1 | * 12/2011 | Britz | H03K 17/78 361/91.5 |
| 2012/0130560 | A1 | * 5/2012 | Sin | G05D 23/1919 700/300 |

FOREIGN PATENT DOCUMENTS

| | | |
|---|---|---|
| EP | 0670481 | 9/1995 |
| JP | 02-191008 | 7/1990 |
| JP | 05-126650 | 5/1993 |
| JP | 09-001617 | 1/1997 |
| JP | 11-248757 | 9/1999 |
| JP | 2000304804 | 11/2000 |
| JP | 2001-255945 | 9/2001 |
| KR | 10-0985961 | 10/2010 |
| KR | 10-1310956 | 9/2013 |

OTHER PUBLICATIONS

State Intellectual Property Office of the People's Republic of China Application Serial No. 201510567759.2, Office Action dated Feb. 8, 2017, 9 pages.
Korean Intellectual Property Office Application Serial No. 10-2014-0101143, Office Action dated Sep. 23, 2015, 5 pages.
Japan Patent Office Application Serial No. 2015-155111, Office Action dated Jul. 19, 2016, 2 pages.

* cited by examiner

APPARATUS AND METHOD FOR CONTROLLING TEMPERATURE

CROSS-REFERENCE TO RELATED APPLICATIONS

Pursuant to 35 U.S.C. § 119(a), this application claims the benefit of earlier filing date and right of priority to Korean Patent Application No. 10-2014-0101143, filed on Aug. 6, 2014, the contents of which are all hereby incorporated by reference herein in its entirety.

BACKGROUND

The present disclosure relates to an apparatus and method for controlling a temperature, and more particularly, to an apparatus and method for controlling a temperature that may isolate each channel of a temperature sensor.

A programmable logic controller (PLC) may include a temperature control device for temperature control and the temperature control device may use an input module and an output module.

The temperature control device may occupy a PLC base slot for each of the input module and the output module, in which case the temperature control device may occupy two PLC base slots and there is inconvenience in independently setting the operation of each module.

When in order to such a limitation, a module occupying one PLC base slot includes temperature input, PID calculation and transistor output functions, it is possible to decrease complexity and inefficiency. In this case, it is possible to solve limitations that PID control performance is affected by the scan time of a PLC CPU and temperature control stops when the PLC CPU has an error.

For such a temperature control device configured to occupy only one slot, it is desirable to secure isolating characteristics for each input channel at the industrial site, in which case the same hardware is configured for each channel in order to secure isolation for each input channel and much cost is required for module configuration.

In particular, analog products require an inter-channel working voltage for many industrial applications. Thus, a product using a multiplexer may overcome constraints of manufacturing cost and space but it is difficult to satisfy the inter-channel working voltage. In addition, a product configured to have isolation for each input channel may present the inter-channel working voltage but it has significant limitations in constraints of manufacturing cost and space.

SUMMARY

Embodiments provide a temperature control apparatus that may reduce a manufacturing cost and overcome a constraint of space and is configured to have insulation for each input channel. Embodiments also provide a temperature control apparatus and method that may smoothly perform effective thermocouple input and transistor output functions.

In one embodiment, a temperature control apparatus includes an analog to digital (AD) converter digital-converting a measurement value transmitted from a plurality of temperature sensors; a control means comparing the measurement value transmitted from the AD converter with a preset desired value to perform PID calculation; and an output unit transmitting, to outside, a pulse width modulation (PWM) control signal transmitted from the control means, wherein an input-side isolator for isolation for each temperature sensor is provided between the AD converter and the temperature sensor, the input-side isolator is connected to each of the temperature sensors, and the control means sequentially operates the input-side isolators.

The input-side isolator may include a pair of solid state relays (SSR) connected to the temperature sensor, wherein each of the SSRs may include: a light emitting diode, and a phototransistor starting operations by light emitted from the light emitting diode.

The pair of SSRs may include a first SSR and a second SSR, an anode of the light emitting diode of the first SSR is mutually connected to a cathode of the light emitting diode of the second SSR, and an anode of the light emitting diode of the second SSR is connected to a voltage source VCC.

The control means may transmit an isolator-on signal to the cathode of the light emitting diode of the first SSR, and operations of the first and second SSRs may be performed according to the isolator-on signal.

The input-side isolator may form one channel by two lines connected to the temperature sensor.

The first SSR and the second SSR may be connected to the channel.

Each of the first SSR and the second SSR may include: a light emitting diode, and a phototransistor starting operations by light emitted from the light emitting diode.

An anode of the light emitting diode of the first SSR may be mutually connected to a cathode of the light emitting diode of the second SSR, and an anode of the light emitting diode of the second SSR may be connected to a voltage source VCC.

The operations of the first and second SSRs may be turned-on according to a control signal transmitted to the cathode of the light emitting diode of the first SSR.

The temperature control apparatus may further include an AD isolator installed between the AD converter and the control means, wherein the AD isolator may include an opto-isolator.

The temperature control apparatus may further include an output-side isolator between the control means and an output unit, wherein the output-side isolator may include an opto-isolator.

The control means may include: a communication unit receiving a preset parameter from an external PLC CPU, a PID calculation unit performing PID control with a temperature value measured by the temperature sensor and a preset desired value to calculate an adjustment value, a memory storing the preset parameter, and a control unit using the adjustment value calculated by the PID calculation unit to generate a PWM control signal.

Another embodiment provides a temperature control apparatus in which temperature sensors requiring a two-line connection are provided, wherein two lines connected to each temperature sensor form one channel and a first SSR and a second SSR are connected to each channel.

Each of the first and second SSRs may include a light emitting diode and a phototransistor.

An anode of the light emitting diode of the first SSR may be mutually connected to a cathode of the light emitting diode of the second SSR, and an anode of the light emitting diode of the second SSR may be connected to a voltage source VCC.

Operations of the first and second SSRs may be turned-on according to a control signal transmitted to the cathode of the light emitting diode of the first SSR.

In further another embodiment, a temperature control method of controlling a temperature by using a temperature control apparatus in which each temperature sensor has each channel and an SSR enabling each channel to be selectively connected to an AD converter is provided includes: determining a type of the temperature sensor selectively connected to the AD converter, turning off operations of SSRs connected to each temperature sensor, selecting a resistor reference working as a reference when a temperature value measured by the temperature sensor is compensated for, selectively operating the SSRs to receive the temperature value sequentially from each temperature sensor, compensating for the received temperature value by using the selected resistor reference to calculate a compensated temperature, and performing PID calculation on the compensated temperature and generating a PWM control signal to be transmitted to an output unit.

The temperature control method may further include, subsequent to the generating of the PWM control signal, determining whether a channel at which the PWM control signal is generated is a last channel.

The temperature control method may further include turning off operations of the SSRs when as a result of determination, the PWM control signal may be generated for all channels configured by each temperature sensor.

The temperature control method may further include, subsequent to the selecting of the resistor reference, selecting a voltage reference determining an acceptable voltage range of the AD converter.

The temperature control apparatus of an embodiment has an advantage in that it is possible to integrate a thermocouple input module and a transistor output module as temperature control modules that have thermocouple input and transistor output functions, among many modules of PLC so that they become one module.

In addition, there is also an advantage in that it is possible to have an inter-channel isolation characteristic even though an inter-channel PCB plane configuration has not independently been equipped.

Such a configuration is obtained by adding a reliable characteristic, inter-channel insulation to the input unit having a single PCB plane configuration and may provide high reliability required for an industrial site.

The details of one or more embodiments are set forth in the accompanying drawings and the description below. Other features will be apparent from the description and drawings, and from the claims.

DETAILED DESCRIPTION OF THE EMBODIMENTS

In the following, detailed descriptions of the present disclosure are provided in detail with reference to the accompanying drawings.

Figure 1:
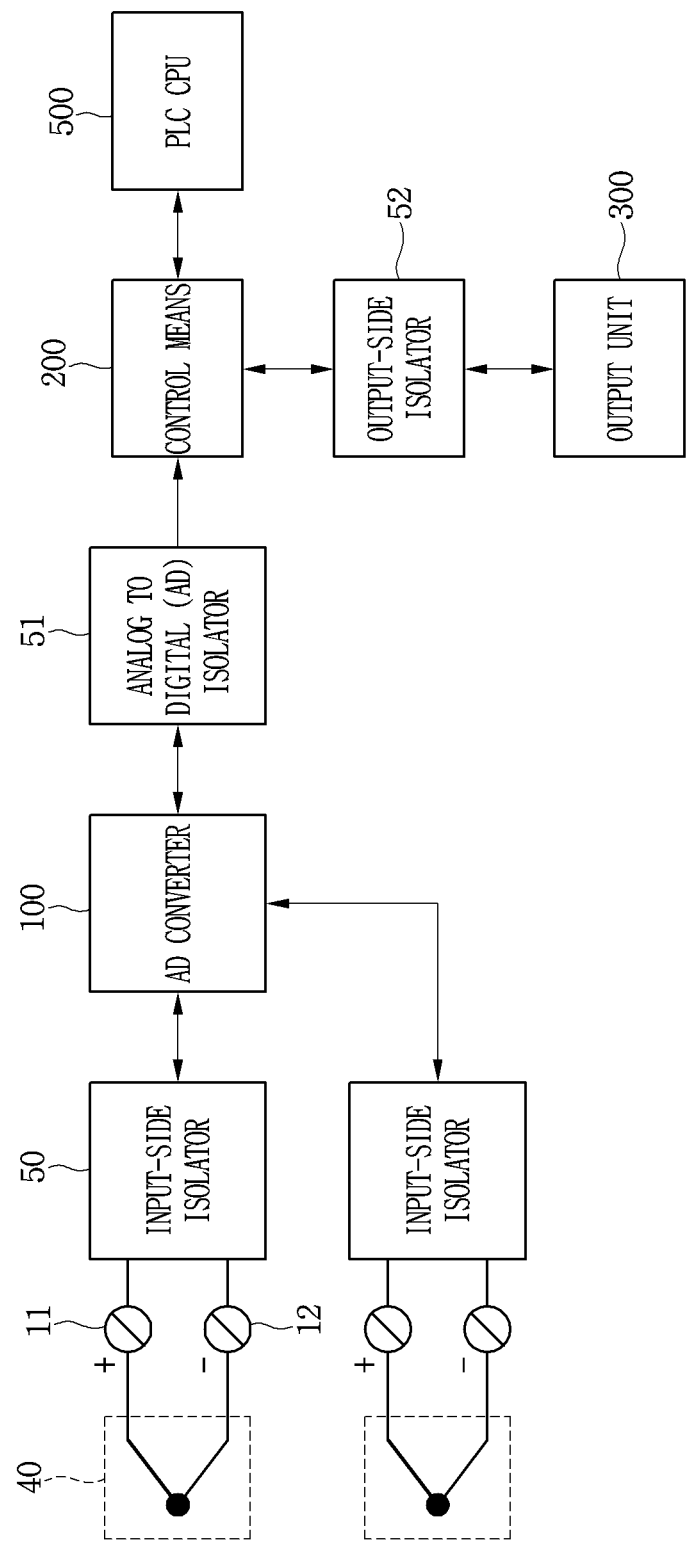
FIG. 1 is a block diagram showing a configuration of a temperature control apparatus of the present disclosure.

FIG. 1 is a block diagram showing a configuration of a temperature control apparatus of the present disclosure.

Referring to FIG. 1, a temperature control apparatus of an embodiment includes an input unit that receives a thermocouple signal for the temperature value of a target to be measured and converts the received signal into a digital signal, a control means 200 that compares a measurement value obtained through conversion by the input unit with a desired value and performs PID control, and an output unit 300 that outputs a PID control result value to the outside according to the control by the control unit 200.

In addition, the input unit includes an analog to digital (AD) converter 100 that receives the output signal of a thermocouple 40 for the temperature value of a target to be measured, i.e., a generated electromotive force and digital-converts the received output signal. Also, an input-side isolator 50 for individually isolating thermocouples 40 that form each channel is provided between the AD converter 100 and the thermocouple 40, and the input-side isolators 50 for forming a separate channel for each thermocouple may be provided in one board among channels. In addition, the detailed configuration of such an input-side isolator 50 is described below in conjunction with particular drawings.

Also, the control means 200 performs communication with the PLC CPU 500, calculates a parameter transmitted from the PLC CPU 500, and transmits a PWM control signal according to PID calculation to the output unit 300.

In addition, an AD isolator 51 may be further provided between the AD converter 100 and the control means 200 and function as a switching element. In addition, the AD isolator 51 may include an opto-isolator.

The output unit 300 may play a role in transmitting, to the outside, the PWN control signal transmitted from the control means 200 and an adjustment value PID-calculated by the control means 200 and include a Darlington transistor. In addition, an output-side isolator 52 for switching may also be provided between the control means 200 and the output unit 300 and include an opto-isolator.

Figure 2:
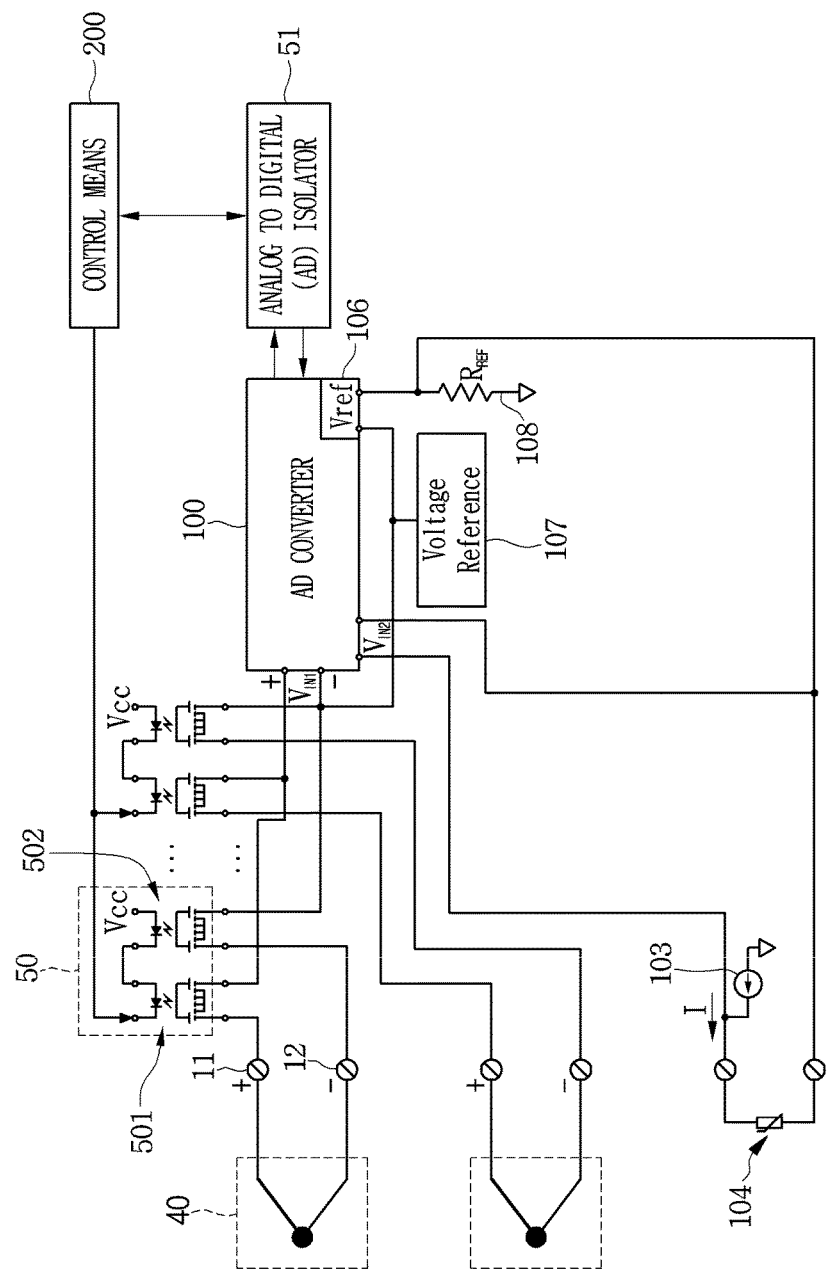
FIG. 2 is a diagram for explaining an input-side isolator that performs isolation for each input channel at a temperature control apparatus of an embodiment.
Figure 3:
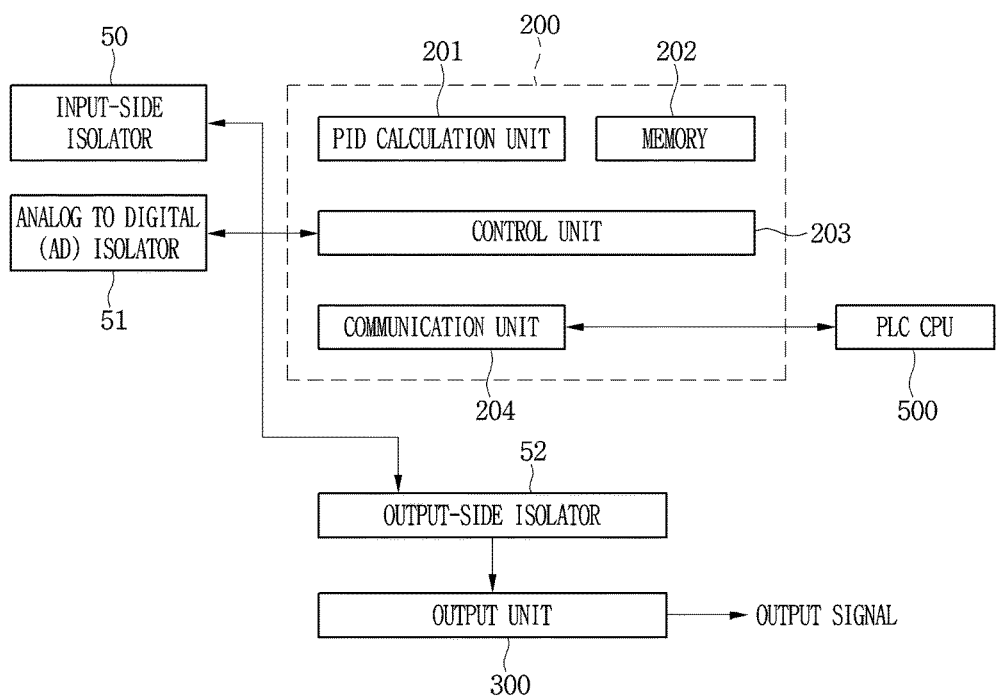
FIG. 3 is a diagram for explaining a configuration of a control means of a temperature control apparatus of an embodiment.

FIG. 2 is a diagram for explaining an input-side isolator that performs isolation for each input channel at a temperature control apparatus of an embodiment, and FIG. 3 is a diagram for explaining a configuration of a control means of a temperature control apparatus of an embodiment.

An input unit of the temperature control apparatus of the embodiment includes one constant current source 103, a thermistor 104 for reference junction compensation, a voltage reference for the reference voltage generation of the AD converter 100 and a reference resistor 108 used for reference junction compensation.

In addition, the input unit of the embodiment needs for two terminals 11 and 12 connecting a sensor line to be provided for each channel.

In particular, the input-side isolator 50 that may decrease an area occupied by a configuration for isolating each of the thermocouples 40 working as input channels and reduce a manufacturing cost is discussed in detail.

Firstly, referring to FIG. 2, the input-side isolator 50 that performs isolation on thermocouples working as respective input channels according to an embodiment is shown in detail. In particular, since the thermocouple 40 that is one of temperature sensors is installed as the input channel, each of the isolators should have a two-line connection for an electrical connection to the one thermocouple.

The input-side isolator 50 is proposed as a structure for isolation for each input channel and may be provided to be equal in number to the thermocouples 40 provided.

In addition, the input-side isolator 50 includes solid state relays (SSR), each of which includes a light-emitting diode and a phototransistor. In the following description, the isolation structures for each channel are described centered mostly around the first thermocouple 40 from among the plurality of thermocouples.

The plus terminal 11 of the thermocouple 40 is connected to one terminal of the phototransistor of a first SSR 501 and the minus terminal 12 of the thermocouple 40 is connected to one terminal of the phototransistor of a second SSR 502. In addition, the anode of the light emitting diode of the first SSR 501 and the cathode of the light emitting diode of the second SSR 502 are electrically connected and the anode of the light-emitting diode of the second SSR 502 is connected to a VCC power source.

In addition, a control signal transmitted from the control unit of the control means 200 is transmitted to the cathode of the first 501 of a pair of SSRs. Thus, in order to transmit the electromotive force of the thermocouple 40 connected to the first channels 11 and 12 to the AD converter 100, the control means 200 transmits a low signal to the LED of the first SSR 501.

By the control signal transmitted from the control means 200, the second SSR 502 and the first SSR 501 are electrically connected and a power source connected to the anode of the second SSR 502 may be supplied to the second SSR 502 and the first SSR 501.

Through such a method, it is possible to transmit, the electromotive force of the thermocouple of each channel including one thermocouple, to the AD converter 100. In this case, when the thermocouple of one channel is connected through a pair of SSRs, the control means 200 needs to perform sequential control so that the channel of another thermocouple is not connected. That is, there is a need to transmit a control signal to the first SSR configuring the input-side isolator sequentially according to a determined order.

The thermocouple signal transmitted to the AD converter 100 is AD-converted by using a reference voltage generated from the voltage reference 107, and a thermistor 104 signal for reference junction compensation is AD-converted by using the reference resistor 108. For the reference junction compensation, it is possible to measure a voltage generated from the thermistor 104 by enabling a certain current to flow into the thermistor 104.

For example, in case that the electromotive force generated from the thermocouple is generated at a temperature of 0° C., there is a need to measure a voltage generated from the thermistor 104 for measuring room temperature because there is a need to measure the room temperature and compensate therefor.

To this end, the AD converter 100 configuring an input unit needs to have a plurality of voltage reference terminals and support a serial interface to enable the voltage reference selection of a signal for each sensor through the control means 200.

Since the electromotive force generated from a thermocouple sensor is significantly small in size, an amplifier for amplifying an analog signal may be further provided in front of the AD converter 100. In addition, the constant voltage reference 107 used as a voltage reference, among two references of thermocouple conversion, voltage and resistor references is configured as a separate part or when the AD converter 100 including the voltage reference is used, there may be no separate part.

The constant current source used for the reference junction compensation may vary in size according to a temperature at which a product is used but under the configuration using the reference resistor 108, the effect that such a variation has on temperature measurement quality may be cancelled for the following reason.

When the size of the constant current source increases according to a variation in temperature, a voltage applied to the reference resistor 108 also increases and thus an input voltage range that the AD converter 100 may accept increases. On the contrary, when the size of the constant current source decreases, the voltage applied to the reference resistor 108 also decreases and thus the input voltage range that the AD converter 100 may accept decreases. Such a configuration for maintaining the measurement ratio of a certain analog signal is a method of minimizing the effect of a temperature drift.

Next, the configuration of a control means of the present disclosure is described in detail with reference to FIG. 3.

Referring to FIG. 3, the control means 200 of an embodiment includes a communication unit 204 receiving a preset parameter from an external PLC CPU, a PID calculation unit 201 performing PID control by using a temperature value measured from a thermocouple being a temperature sensor and a preset desired value to calculate an adjustment value, a memory 202 storing the preset parameter, and a control unit 203 generating a PWM control signal by using the adjustment value calculated by the PID calculation unit 201 and transmitting the generated PWM control signal to an output unit.

In addition, the control unit 203 uses the preset parameter to determine the type of a signal input to the AD converter being the input unit and controls digital conversion by the AD converter 100 according to the type of the signal. In addition, the control unit 203 generates a PWM control signal by using the adjustment value calculated by the PID calculation unit 201 and the preset parameter and transmits the PWM control signal to the output unit to reflect the calculated adjustment value.

In particular, the PID calculation unit 201 performs PID calculation calculating the adjustment value MV so that a measurement value PV becomes a desired value SV. In addition, a parameter that the communication unit 204 receives is stored in the memory 202 and the adjustment value MV calculated by the PID calculation unit 201 may also be stored therein.

The output unit 300 may include a Darlington transistor that outputs the calculated adjustment value to the outside according to the PWM control signal. In this case, a connection for a cooling output and a connection for a heating output are formed for the output unit 300 and isolators are provided among the input unit, the control means 200, and the output unit 300. For example, the AD isolator 51 may be provided between the AD converter 100 configuring the input unit and the control means 200 and the output-side isolator 52 may be provided between the control means 200 and the output unit 300. As described earlier, the AD converter 51 and the output-side isolator 52 include opto-isolators.

The isolation structure of the present disclosure and the temperature control apparatus including such a structure integrate the thermocouple input module and the transistor output module as temperature control modules that have thermocouple input and transistor output functions, among many modules of PLC so that they become one module. In addition, a structure has been proposed which has an inter-channel isolation characteristic even though an inter-channel plain configuration has not independently been equipped.

Such a configuration is obtained by adding a reliable characteristic, inter-channel isolation to the input unit having a single PCB plane configuration and may provide high reliability required for an industrial site.

The input-side isolator 50 of an embodiment enables the absolute maximum rating of the input/output (I/O) isolation voltage retained by SSR to be provided as the inter-channel isolation specification and may thus protect an internal circuit from an over-current induced to an analog input path.

Also, the present disclosure uses two references in order to decrease typical thermocouple measurement errors and thus uses a precise voltage reference for thermocouple measurement. In addition, it is possible to obtain a precise thermocouple measurement result by using a resistor reference capable of minimizing the effect of a temperature drift for reference junction compensation. Such a configuration may be achieved by two or more references and the AD converter 100 that has a serial interface to enable the switching of the references.

In this example, the selection of the voltage reference for increasing analog conversion quality is performed between reference junction conversion and the turn on of the SSR of a corresponding channel. This has effects in that a transitional state according to reference switching is removed when a thermocouple signal is converted to a digital signal and thermocouple signal quality increases.

Figure 4:
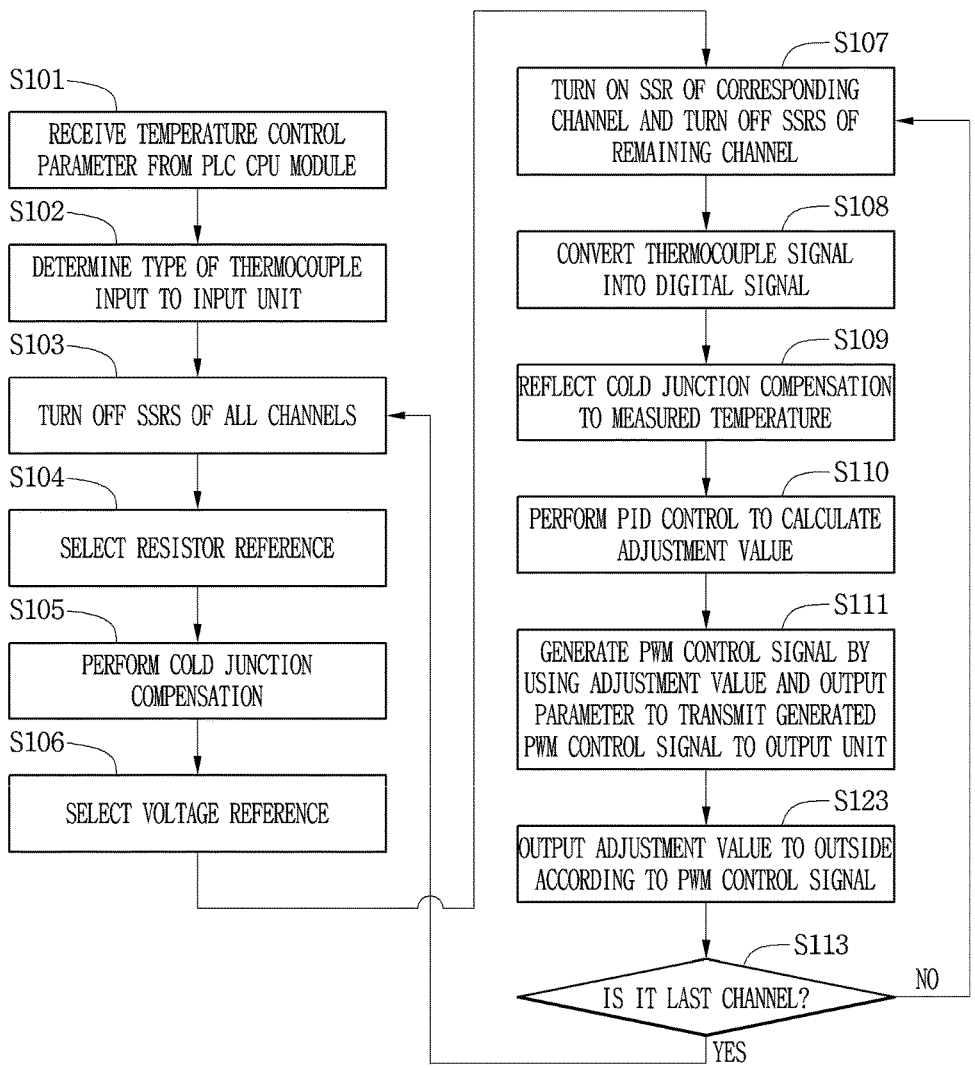
FIG. 4 is a flow chart of a temperature control method by a temperature control apparatus according to an embodiment.

Such a temperature control method is described in detail in conjunction with a flowchart of FIG. 4.

The temperature control method by the temperature control apparatus of an embodiment may control a temperature by using the temperature control apparatus in which each temperature sensor 40 has each channel and an SSR enabling each channel; to be selectively connected to the AD converter 100 is provided.

The temperature control method by the temperature control apparatus may include determining a type of temperature sensor 40 selectively connected to the AD converter 100.

The control means 200 may receive a temperature control parameter from a PLC CPU module in step S101. When the control means 200 receives the temperature control parameter, the temperature control apparatus may start operating. In addition, the control means 200 may determine a type of thermocouple from a thermocouple output signal (electromotive force) that is input to the AD converter 100 in step S102. Since the thermocouple is obtained by the bonding of different materials, the size of the generated electromotive force may vary according to the type of thermocouple and the control means 200 needs to check the type of thermocouple at the early stage of operation of the temperature control apparatus.

After the determination of the type of thermocouple, the temperature control method by the temperature control apparatus may include turning off the operations of the SSRs connected to the temperature sensors 40, respectively.

The control means 200 may turn off the operations of the SSRs of all channels, i.e., respective input-side isolators in step S103. In this case, the input-side isolators may perform an initialization process and the input-side isolators may maintain the turn-off state. While the turn-off state of all input-side isolators is maintained, the PLC CPU 500 and the control means 200 may communicate with each other, the control means 200 may receive a necessary parameter from the PLC CPU 500, and a measured temperature value may be transmitted from the control means 200 to the PLC CPU 500.

Thus, while reference junction compensation is performed later, a time for which input channels are exposed to a thermocouple sensor outside a module may be minimized and it is possible to minimize the entry of external noise.

The temperature control method by the temperature control apparatus may include selecting a resistor reference working as a reference when a temperature value measured by the temperature sensor 40 is compensated for.

After turning off the operation of each input-side isolator, selecting the resistor reference may be performed in step S104. In the embodiment, there may be a difference in voltage at opposite ends of the thermistor 104 by a current generated from the constant current source 103 and it is possible to compensate for the measurement value of a thermocouple by using it. In the embodiment, it is possible to use the resistor reference by such a thermistor 104 along with the reference voltage generated by the voltage reference 107 that generates a constant voltage.

As described earlier, temperature compensation for replacing a measurement value measured by a thermocouple with an actual temperature value, e.g., cold junction compensation is performed and it is possible to set the resistor reference of the thermistor 104 in order to set a reference temperature.

After the selection of the resistor reference, voltage reference selection that determines the acceptable voltage range of the AD converter 100 may be performed.

Next, a reference temperature is calculated by using a difference in voltage at opposite ends of the thermistor 104 in step S105. In addition to the setting of such a resistor reference, it is possible to select a voltage reference by the constant voltage reference 107 that generates a constant voltage in step S106.

By selectively operating the SSRs, the temperature control method by the temperature control apparatus may include receiving a temperature value sequentially from each of the temperature sensors 40.

Temperature measurement on each thermocouple channel is performed and the input-side isolator 50 operates sequentially for each channel for inter-channel isolation. That is, the SSR of a corresponding channel to be measured is turned on and the SSRs of remaining channels are turned off in step S107.

The temperature control method by the temperature control apparatus may include calculating a compensated temperature by compensating for a received temperature value by using the selected resistor reference.

Thermocouple signals transmitted from a pair of SSRs per channel are digital-converted in step S108 and the digital-converted measurement temperature is compensated for by using cold junction compensation calculated earlier in step S109. That is, the measurement temperature by the thermocouple is compensated for/corrected based on an actual ambient temperature and the temperature value measured by the thermocouple (temperature sensor) is compensated for so that a compensated temperature is calculated.

The temperature control method by the temperature control apparatus may include performing PID calculation on a compensated temperature and generating a PWM control signal to be transmitted to the output unit.

The control means 200 compares the compensated temperature with a preset desired value and performs PID control to calculate an adjustment value in step S1110, and uses the adjustment value and an output parameter to generate a PWM control signal. The control means 200 transmits the generated PWM control signal to the output unit in step S111.

The output unit may transmit the PWM control signal to an external device and the adjustment value adjusted by the control means 200 may be reflected to the operation of the external device in step S112.

These processes are performed sequentially on each channel and after PID control over the last channel is performed, the operations of all SSRs are turned off and an idle period is provided.

After the generation of the PWM control signal, the temperature control method by the temperature control apparatus may further include determining whether the channel at which the PWM control signal has been generated is the last channel.

In addition, when as a result of determination, all PWM control signals for channels configured respectively by temperature sensors 30 have been generated, the temperature control method by the temperature control apparatus may further include turning off the operations of all SSRs in step S103.

The control means 200 and the external PLC CPU 500 may perform bidirectional communication for such an idle period.

By the above-described method, the sampling period of the temperature control apparatus having n channels is referred to as T and the sampling period of one channel is referred to as T/(n+1). For example, when it is assumed that there is a four-channel module that has a sampling period of 500 ms, the sampling period of one channel is 100 ms, and 400 ms is consumed for the thermocouple conversion of four channels. In addition, remaining 100 ms may be assigned as a conversion time for reference junction compensation, a time for communication/memory interface between PLC systems, and a processing time caused by a delay factor between modules. Since the present disclosure provides analog conversion having uniform quality and is also a design considering other delay factors, it possible to provide optimized performance in a PLC temperature control configuration for a thermocouple input and a transistor output.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A temperature control apparatus comprising:
an analog to digital (AD) converter digitally-converting a measurement value transmitted from a plurality of temperature sensors;
a controller comparing the measurement value transmitted from the AD converter with a preset desired value to perform a proportional integral derivative (PID) calculation; and
an output unit transmitting, to outside of the temperature control apparatus, a pulse width modulation (PWM) control signal that has been transmitted from the controller,
wherein an input-side isolator for isolation for each of the plurality of temperature sensors is provided between the AD converter and the temperature sensor,
the input-side isolator is connected to each of the plurality of temperature sensors, and
the controller transmits a control signal to the input-side isolator sequentially according to a determined order,
wherein the input-side isolator comprises a first solid state relay (SSR) and a second solid state relay (SSR) connected to a corresponding temperature sensor,
wherein each of the first SSR and the second SSR comprises a light emitting diode, and a phototransistor starting operations by light emitted from the light emitting diode,
wherein the controller transmits a low signal to the first SSR of a first input-side isolator according to the determined order,
wherein an anode of the light emitting diode of the first SSR is electrically connected to a cathode of the light emitting diode of the second SSR based on the low signal, which allows a voltage source (VCC) to be supplied to the light emitting diode of the first SSR and the light emitting diode of the second SSR, and an anode of the light emitting diode of the second SSR is connected to the VCC, and
wherein one terminal of the phototransistor of the first SSR is connected to a plus terminal of the corresponding temperature sensor, and one terminal of the phototransistor of the second SSR is connected to a minus terminal of the corresponding temperature sensor.

2. The temperature control apparatus according to claim 1, wherein the input-side isolator forms one channel by two lines connected to the corresponding temperature sensor.

3. The temperature control apparatus according to claim 2, wherein the first SSR and the second SSR are connected to the channel.

4. The temperature control apparatus according to claim 1, further comprising an AD isolator installed between the AD converter and the controller,
wherein the AD isolator comprises an opto-isolator.

5. The temperature control apparatus according to claim 4, further comprising an output-side isolator between the controller and the output unit,
wherein the output-side isolator comprises an opto-isolator.

6. The temperature control apparatus according to claim 1, wherein the controller comprises:
a communication unit receiving a preset parameter from an external PLC CPU,
a PID calculation unit performing PID control with a temperature value measured by the plurality of temperature sensors and a preset desired value to calculate an adjustment value,
a memory storing the preset parameter, and
a control unit using the adjustment value calculated by the PID calculation unit to generate a PWM control signal.

* * * * *